United States Patent
Cavalieri

(10) Patent No.: US 8,252,399 B2
(45) Date of Patent: Aug. 28, 2012

(54) PLASTIC TANKS MADE FROM RANDOM COPOLYMERS OF PROPYLENE AND HEXENE-1

(75) Inventor: Claudio Cavalieri, Ferrara (IT)

(73) Assignee: Basell Poliolefine Italia s.r.l., Milan (IT)

( * ) Notice: Subject to any disclaimer, the term of this patent is extended or adjusted under 35 U.S.C. 154(b) by 101 days.

(21) Appl. No.: 12/735,277

(22) PCT Filed: Dec. 19, 2008

(86) PCT No.: PCT/EP2008/068036
§ 371 (c)(1), (2), (4) Date: Jun. 28, 2010

(87) PCT Pub. No.: WO2009/083500
PCT Pub. Date: Jul. 9, 2009

(65) Prior Publication Data
US 2010/0285255 A1 Nov. 11, 2010

Related U.S. Application Data

(60) Provisional application No. 61/010,534, filed on Jan. 9, 2008.

(30) Foreign Application Priority Data

Dec. 28, 2007 (EP) .................... 07150453

(51) Int. Cl.
*B32B 1/02* (2006.01)
*C08F 210/00* (2006.01)

(52) U.S. Cl. ....... 428/36.92; 428/35.7; 526/72; 526/348

(58) Field of Classification Search ............... 428/36.92, 428/35.7; 526/72, 348
See application file for complete search history.

(56) References Cited

U.S. PATENT DOCUMENTS

| | | | |
|---|---|---|---|
| 4,399,054 A | 8/1983 | Ferraris et al. | |
| 4,469,648 A | 9/1984 | Ferraris et al. | |
| 4,971,937 A | 11/1990 | Albizzati et al. | |
| 5,221,651 A | 6/1993 | Sacchetti et al. | |
| 5,698,642 A | 12/1997 | Govoni et al. | |
| 6,515,085 B1 | 2/2003 | Parodi et al. | |
| 6,818,583 B1 | 11/2004 | Morini et al. | |
| 6,825,309 B2 | 11/2004 | Morini et al. | |
| 7,049,377 B1 | 5/2006 | Morini et al. | |
| 7,674,731 B2 | 3/2010 | Marzolla et al. | |
| 2001/0000258 A1 | 4/2001 | McAlpin et al. | |
| 2004/0071690 A1 | 4/2004 | Hudson et al. | |
| 2005/0137368 A1 | 6/2005 | Weng et al. | |
| 2007/0196608 A1 | 8/2007 | De Palo et al. | |
| 2007/0254801 A1 | 11/2007 | Razavi et al. | |
| 2009/0030098 A1 | 1/2009 | Cagnani et al. | |

*Primary Examiner* — Rena Dye
*Assistant Examiner* — Yan Lan
(74) *Attorney, Agent, or Firm* — Dilworth IP LLC

(57) ABSTRACT

Plastic tanks comprising a propylene-hexene-1 copolymer having a xylene soluble fraction lower than 5% wt with respect to the total weight of the copolymer and satisfying the following relation:

$$\frac{A \cdot T_m}{B} > 70$$

wherein A is the MFR measured according to the method ISO 1133 (230° C., 5 kg) expressed in g/10 min, $T_m$ is the melting temperature measured by DSC expressed in ° C. and B is the hexene-1 content expressed in percentage by weight with respect to total weight of the copolymer.

6 Claims, No Drawings

PLASTIC TANKS MADE FROM RANDOM COPOLYMERS OF PROPYLENE AND HEXENE-1

This application is the U.S. national phase of International Application PCT/EP2008/068036, filed Dec. 19, 2008, claiming priority to European Patent Application 07150453.4 filed Dec. 28, 2007, and the benefit under 35 U.S.C. 119(e) of U.S. Provisional Application No. 61/010,534, filed Jan. 9, 2008; the disclosures of International Application PCT/EP2008/068036, European Patent Application 07150453.4 and U.S. Provisional Application No. 61/010,534, each as filed, are incorporated herein by reference.

The present invention relates to plastic tanks made from propylene copolymers of propylene and hexene-1.

With the term "plastic tanks" it is intended, for example, expansion tanks, water collecting tanks, vertical and horizontal tanks, cone bottom tanks, open top tanks and others.

Specific kind of tanks, in particular expansion tanks for cooling circuits, are designed for resisting to mid-long term temperature and pressure cycles. These particular conditions, especially at temperatures higher than 100° C., cause the occurrence of cracks or crazes under stress well below yield strength of the material. Such crazes can propagate and finally cause leakage or break. At higher stress levels, yielding can occur immediately or after some times with or without appearance of crazes.

In order to meet the above needs, the plastic material used for plastic tanks must be endowed with high mechanical properties. Moreover, since the plastic tanks are produced by injection moulding techniques, said plastic material has to combine optimal intrinsic mechanical properties with the suitability to provide homogeneous injection moulded tanks.

Propylene copolymers comprising propylene and hexene-1 are already known in the art and used in various applications, for example the international application WO 2005/059210 discloses fibres for thermal bonding comprising random copolymers of propylene and hexene-1 showing good balance of mechanical properties, in particular high tenacity and good elongation at break.

The international application WO 2006/002778 discloses pipe systems made from polymers of propylene and hexene-1 exhibiting good burst pressure resistance and rigidity. In both the applications, nothing is said about the mechanical performances of said copolymers at high temperatures or about their use in the plastic tanks field.

Accordingly, it is an object of the present invention to provide plastic tanks, in particular expansion tanks, made from propylene-hexene-1 copolymers able to give optimal performances in terms of high temperature creep resistance, time to rupture and mode of failure.

It is a further object of the present invention to provide propylene-hexene-1 copolymers particularly suitable for plastic tanks obtained by injection moulding techniques.

According to the present invention there is provided plastic tanks, in particular expansion tanks, comprising a propylene-hexene-1 copolymer optionally comprising a further recurring unit derived from α-olefins selected from ethylene and a $C_5$-$C_{10}$ α-olefin, hexene-1 excluded, having a xylene soluble fraction lower than 5% wt, preferably lower than 4% wt with respect to the total weight of the copolymer and satisfying the following relation:

$$\frac{A \cdot T_m}{B} > 70$$

wherein A is the MFR (Melt Flow Rate) measured according to the method ISO 1133 (230° C., 5 kg) expressed in g/10 min, $T_m$ is the melting temperature measured by DSC expressed in ° C. and B is the hexene-1 content expressed in percentage by weight with respect to the total weight of the copolymer and measured by IR spectroscopy.

Preferably the ratio $A \cdot T_m/B$ has a value higher than 100, more preferably comprised between 110 and 500.

It has surprisingly been found that the propylene-hexene-1 copolymers satisfying the above relation are particularly suitable to be used for plastic tanks, in particular expansion tanks, providing tanks with an optimal balance between mechanical properties such as rigidity and mid-long term high temperature creep resistance and particularly suitable to be used for injection moulding techniques.

The propylene-hexene-1 copolymers not satisfying the above-mentioned relation, therefore having a value of the ratio $A \cdot T_m/B$ lower than 70, show low mechanical properties at high temperatures and are not able to be used for plastic tanks, in particular for expansion tanks. Optimal results in terms of mechanical properties at high temperatures can be obtained when the melting temperature of the propylene-hexene-1 copolymers are higher than 145° C., preferably higher than 147° C. and, the MFR values are comprised between 0.8 and 30 g/10 min, preferably from 1 and 25 g/10 min, the hexene-1 content ranges from 0.5 to 5% wt, preferably from 0.2 to 4% wt, more preferably from 0.2 to 3% wt with respect to the total weight of the copolymer.

The propylene-hexene-1 copolymers according to the present invention show values of Polydispersity Index determined by rheological method described below typically comprised between 1 and 7, preferably between 2 and 6.

At 130° C., said propylene-hexene-1 copolymers show tensile modulus values comprised between 150 and 220 MPa, preferably between 180 and 210 MPa measured according to the method described below on specimens cut perpendicular to flow.

Typical values of Izod at 23° C., measured according to ISO 180/1A method, are comprised between 5 and 20 KJ/m², preferably between 8 and 15 KJ/m², while the values of Flexural Modulus can range from 1100 to 1700 N/mm², preferably from 1300 to 1500 N/mm².

The propylene-hexene-1 polymers used in the present invention can be prepared by polymerisation in one or more polymerisation steps. Such polymerisation can be carried out in the presence of Ziegler-Natta catalysts.

Preferably, the polymerization stage is carried out in presence of a highly stereospecific heterogeneous Ziegler-Natta catalyst. The Ziegler-Natta catalysts suitable for producing the propylene polymer compositions of the invention comprise a solid catalyst component comprising at least one titanium compound having at least one titanium-halogen bond and at least an electron-donor compound (internal donor), both supported on magnesium chloride. The Ziegler-Natta catalysts systems further comprise an organo-aluminum compound as essential co-catalyst and optionally an external electron-donor compound.

Suitable catalysts systems are described in the European patents EP45977, EP361494, EP728769, EP 1272533 and in the international patent application WO00/63261.

Preferably, the solid catalyst component comprises Mg, Ti, halogen and an electron donor selected from esters of phthalic acids disclosed in EP45977 and in particular of either diisobutylphathalate or dihexylphthalate or ° diethylphthalate and mixtures thereof.

According to a preferred method, the solid catalyst component can be prepared by reacting a titanium compound of formula $Ti(OR)_{n-y}X_y$, where n is the valence of titanium and y is a number between 1 and n, preferably $TiCl_4$, with a magnesium chloride deriving from an adduct of formula $MgCl_2 \cdot pROH$, where p is a number between 0.1 and 6, preferably from 2 to 3.5, and R is a hydrocarbon radical having 1-18 carbon atoms. The adduct can be suitably prepared in spherical form by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles. Examples of spherical adducts prepared according to this procedure are described in U.S. Pat. Nos. 4,399,054 and 4,469,648. The so obtained adduct can be directly reacted with the Ti compound or it can be previously subjected to thermal controlled dealcoholation (80-130° C.) so as to obtain an adduct in which the number of moles of alcohol is generally lower than 3, preferably between 0.1 and 2.5. The reaction with the Ti compound can be carried out by suspending the adduct (dealcoholated or as such) in cold $TiCl_4$ (generally 0° C.); the mixture is heated up to 80-130° C. and kept at this temperature for 0.5-2 hours. The treatment with $TiCl_4$ can be carried out one or more times. The internal donor can be added during the treatment with $TiCl_4$ and the treatment with the electron donor compound can be repeated one or more times. Generally, the internal donor is used in molar ratio with respect to the $MgCl_2$ of from 0.01 to 1 preferably from 0.05 to 0.5. The preparation of catalyst components in spherical form is described for example in European patent application EP-A-395083 and in the International patent application WO98/44001. The solid catalyst components obtained according to the above method contain the titanium compound, expressed as Ti, generally in an amount from 0.5 to 10% by weight.

Moreover, they show a surface area (by B.E.T. method) generally between 20 and 500 $m^2/g$ and preferably between 50 and 400 $m^2/g$, and a total porosity (by B.E.T. method) higher than 0.2 $cm^3/g$ preferably between 0.2 and 0.6 $cm^3/g$. The porosity (Hg method) due to pores with radius up to 10.000 Å generally ranges from 0.3 to 1.5 $cm^3/g$, preferably from 0.45 to 1 $cm^3/g$.

The organo-aluminum compound is preferably an alkyl-Al selected from the trialkyl aluminum compounds such as for example triethylaluminum, triisobutylaluminum, tri-n-butylaluminum, tri-n-hexylaluminum, tri-n-octylaluminum. It is also possible to use mixtures of trialkylaluminum's with alkylaluminum halides, alkylaluminum hydrides or alkylaluminum sesquichlorides such as $AlEt_2Cl$ and $Al_2Et_3Cl_3$.

The Al-alkyl compound is generally used in such a quantity that the Al/Ti ratio be from 1 to 1000.

Preferred external electron-donor compounds include silicon compounds, ethers, esters such as ethyl 4-ethoxybenzoate, amines, heterocyclic compounds and particularly 2,2,6,6-tetramethyl piperidine, ketones and the 1,3-diethers. Another class of preferred external donor compounds is that of silicon compounds of formula $R_a^5 R_b^6 Si(OR^7)_c$, where a and b are integer from 0 to 2, c is an integer from 1 to 3 and the sum (a+b+c) is 4; $R^5$, $R^6$, and $R^7$, are alkyl, cycloalkyl or aryl radicals with 1-18 carbon atoms optionally containing heteroatoms. Particularly preferred are methylcyclohexyldimethoxysilane, diphenyldimethoxysilane, methyl-t-butyldimethoxysilane, dicyclopentyldimethoxysilane, 2-ethylpiperidinyl-2-t-butyldimethoxysilane and 1,1,1,trifluoropropyl-2-ethylpiperidinyl-dimethoxysilane and 1,1,1,trifluoropropyl-metil-dimethoxysilane. The external electron donor compound is used in such an amount to give a molar ratio between the organo-aluminum compound and said electron donor compound of from 0.1 to 500.

In particular, even if many other combinations of the previously said catalyst components may allow to obtain propylene polymer compositions according to the present invention, the propylene-hexene-1 polymers are preferably prepared by using catalysts containing an ester of phthalic acid as inside donor and $(cyclopentyl)_2Si(OCH_3)_2$ as outside donor.

The catalysts generally used in the process of the invention are capable of producing polypropylene with a value of xylene insolubility at ambient temperature greater than 90% wt, preferably greater than 95% wt.

As already mentioned said propylene-hexene-1 polymers can be produced by a well-known polymerisation process. According to the preferred polymerisation process such polymers are produced by a polymerisation process carried out in a gas-phase polymerization reactor comprising at least two interconnected polymerisation zones.

The process according to the preferred polymerisation process is illustrated in EP application 782 587.

In detail, the process is carried out in a first and in a second interconnected polymerization zones into which propylene and hexene-1 are fed in the presence of a catalyst system and from which the polymer produced is discharged. In said process the growing polymer particles flow upward through one (first) of the said polymerisation zones (riser) under fast fluidisation conditions, leave said riser and enter another (second) polymerisation zone (downcomer) through which they flow downward in a densified form under the action of gravity, leave said downcomer and are reintroduced into the riser, thus establishing a circulation of polymer between the riser and the downcomer.

In the downcomer high values of density of the solid are reached, which approach the bulk density of the polymer. A positive gain in pressure can thus be obtained along the direction of flow, so that it becomes possible to reintroduce the polymer into the riser without the help of special mechanical means. In this way, a "loop" circulation is set up, which is defined by the balance of pressures between the two polymerisation zones and by the head loss introduced into the system.

Generally, the condition of fast fluidization in the riser is established by feeding a gas mixture comprising the relevant monomers to said riser. It is preferable that the feeding of the gas mixture is effected below the point of reintroduction of the polymer into said riser by the use, where appropriate, of gas distributor means. The velocity of transport gas into the riser is higher than the transport velocity under the operating conditions, preferably from 2 to 15 m/s.

Generally, the polymer and the gaseous mixture leaving the riser are conveyed to a solid/gas separation zone. The solid/gas separation can be effected by using conventional separation means. From the separation zone, the polymer enters the downcomer. The gaseous mixture leaving the separation zone is compressed, cooled and transferred, if appropriate with the addition of make-up monomers and/or molecular weight regulators, to the riser. The transfer can be carried out by means of a recycle line for the gaseous mixture.

The control of the polymer circulation between the two polymerisation zones can be carried out by metering the amount of polymer leaving the downcomer using means suitable for controlling the flow of solids, such as mechanical valves.

The operating parameters, such as the temperature, are those that are usual in olefin polymerisation process, for example between 50 to 120° C.

The operating pressures can range between 0.5 and 10 MPa, preferably between 1.5 to 6 MPa.

Optionally, one or more inert gases, such as nitrogen or an aliphatic hydrocarbon, are maintained in the polymerization zones, in such quantities that the sum of the partial pressures of the inert gases is preferably between 5 and 80% of the total pressure of the gases.

The various catalysts are fed up to the riser at any point of the said riser. However, they can also be fed at any point of the downcomer. The catalyst can be in any physical state, therefore catalysts in either solid or liquid state can be used.

The propylene-hexene-1 copolymers of the invention may also be blended with any other additives commonly employed in the art, such as antioxidants, light stabilizers, heat stabilizers, phenolic antioxidants, slip agents such as calcium stearate and any other nucleating agents selected among talc, aromatic carboxylic salts, salts of monocarboxylic or polycarboxylic acids, e.g. sodium benzoate, aluminum tert-butylbenzoate or dicetyl peroxydicarbonate.

According to a particular embodiment of the invention, the propylene-hexene-1 copolymers of the present invention can be addittivated with at least a Hindered Amine Light Stabiliser (HALS) in place of phenolic antioxidants.

The substitution of phenolic antioxidants with specific amount of HALS provide propylene-hexene-1 copolymers which exhibit a better Yellowness Index with respect to those comprising phenolic antioxidants meaning that the plastic tanks comprising the propylene-hexene-1 copolymers addittivated with HALS show reduced discoloration than those comprising the propylene-hexene-1 copolymers blended with usual packing of stabilisers. The HALS used according to the present invention are monomeric or oligomeric compounds containing, in the molecule, one or more substituted piperidine groups having general formula:
(I)

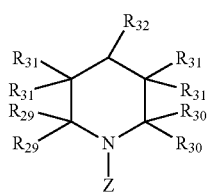

in which the $R_{29}$ radicals, equal or different, are $C_1$-$C_4$ alkyl radicals, or tetramethylpiperidine radicals, or the alkyl radicals form with the piperidine carbon atoms to which they are linked a $C_5$-$C_9$ cycloalkyl radical; the $R_{30}$ radicals, equal or different, are hydrogen or $C_1$-$C_{18}$ alkyl radicals, $C_7$-$C_{18}$ arylalkyl radicals, or the alkyl radical forms with the piperidine carbon atoms to which they are linked a $C_5$-$C_{10}$ cycloalkyl radical; the $R_{31}$ radicals, equal or different, are hydrogen, or $C_1$-$C_{18}$ alkyl radicals or $C_7$-$C_{18}$ arylalkyl radicals; the $R_{32}$ radical is hydrogen, or a $C_1$-$C_8$ alkyl radical, or a benzyl radical; Z is hydrogen, or a $C_1$-$C_{18}$ alkyl, $C_1$-$C_{12}$ alkylene, $C_3$-$C_{12}$ alkenyl, $C_3$-$C_5$ alkynyl, $C_7$-$C_{18}$ arylalkyl, $C_2$-$C_4$ acyl, $C_2$-$C_{18}$ alkanoyl, $C_3$-$C_{18}$ alkoxyalkyl, $C_3$-$C_{18}$ alkenoyl, oxylic, cyanomethyl, xylylenyl radical, or a radical having a 1 to 4 valence and containing from 1 to 4 hydroxyl groups and, optionally, ether, ester, or heterocyclic groups, being the valences of said radical linked to the nitrogen of piperidine groups, or a bivalent radical containing one or more ester or amide groups, or a —CO—N($R_{33}$)($R_{34}$) radical where $R_{33}$ and $R_{34}$ are hydrocarbon radicals.

Preferably Z is a $C_1$-$C_{12}$ alkyl radical, or a $C_3$-$C_8$ alkenyl, $C_7$-$C_{11}$ aralkyl radical, or a bivalent radical containing one or more ester groups, being the valences of said radicals linked to the nitrogen atom of piperidine groups.

Specific examples of preferred HALS according to the present invention include poly[[6-[(1,1,3,3-tetramethylbutyl) amino]-1,3,5-triazine-2,4-diyl][(2,2,6,6-tetramethyl-4-piperidinyl) imino]-1,6-hexanediy[(2,2,6,6-tetramethyl-4-piperidinyl)imino]]; N,N',N'',N'''-tetrakis(4,6-bis(butyl-(N-methyl-2,2,6,6-tetramethylpiperidin-4-yl)-amino)triazin-2-yl)-4,7-diazadecane-1,10-diamine; (1,6-hexanediamine, N,N'-bis(2,2,6,6-tetramethyl-4-piperidinyl)-polymer, and poly-(N-β-hydroxyethyl-2,2,6,6-tetramethyl-4-hydroxy-piperidyl succinate). They are commercially available from Ciba Speciality Chemicals Corporation under the Chimassorb 944 trademark, Chimassorb 119 trademark, Chimassorb 2020 trademark and Tinuvin 622 or Tinuvin 119 trademark, respectively.

Typically the amount of HALS comprised in the propylene-hexene-1 copolymers according to the present invention can range from 200 to 3000 ppm, preferably from 500 to 2500 ppm.

The following examples are given to illustrate the present invention without limiting purpose.

The data relating to the propylene copolymers of the examples are determined by way of the methods reported below.

Melting Temperature and Crystallization Temperature: Determined by differential scanning calorimetry (DSC). Weighting 6±1 mg, is heated to 220±1° C. at a rate of 20° C./min and kept at 220±1° C. for 2 minutes in nitrogen stream and it is thereafter cooled at a rate of 20° C./min to 40±2° C., thereby kept at this temperature for 2 min to crystallise the sample. Then, the sample is again fused at a temperature rise rate of 20° C./min up to 220° C.±1. The second melting scan is recorded, a thermogram is obtained, and, from this, temperatures corresponding to peaks are read.

Melt Flow Rate: Determined according to the method ISO 1133 (230° C., 5 kg).

Solubility in xylene: Determined as follows.
2.5 g of polymer and 250 ml of xylene are introduced in a glass flask equipped with a refrigerator and a magnetical stirrer. The temperature is raised in 30 minutes up to the boiling point of the solvent. The so obtained clear solution is then kept under reflux and stirring for further 30 minutes. The closed flask is then kept for 30 minutes in a bath of ice and water and in thermostatic water bath at 25° C. for 30 minutes as well. The so formed solid is filtered on quick filtering paper. 100 ml of the filtered liquid is poured in a previously weighed aluminium container, which is heated on a heating plate under nitrogen flow, to remove the solvent by evaporation. The container is then kept on an oven at 80° C. under vacuum until constant weight is obtained. The weight percentage of polymer soluble in xylene at room temperature is then calculated.

1-hexene content: Determined by IR spectroscopy.
Polydispersity Index (PI): Determined at a temperature of 200° C. by using a parallel plates rheometer model RMS-800 marketed by RHEOMETRICS (USA), operating at an oscillation frequency which increases from 0.1 rad/sec to 100 rad/sec. From the crossover modulus one can derive the P.I. by way of the equation:

$$P.I.=10^5/Gc$$

in which Gc is the crossover modulus which is defined as the value (expressed in Pa) at which G'=G" wherein G' is the storage modulus and G" is the loss modulus.

Static Tensile Stress and Uniaxial Tensile Creep tests: specimens for both static and creep tests were cut from injection molded plaques (250×150×3.15 mm), some specimens were cut parallel to the direction of the injection flow, some others perpendicular to the direction of the injection flow. Shape of specimen was chosen same as profile of the ISO R527 type 1B tensile bars, and thickness was kept the same as the plaques from which specimens were cut (3.15 mm).

Specimens were fixed vertically at one end in a support inside a conditioning oven able to keep the temperature at the specified value, and a weight was put at the other end, in order to generate the required stress in the specimen. Elongation of the specimen during the test and failure time were recorded. Static tensile test results are reported in Table 3.

Creep test results are reported in Table 4.

Yellowness Index Determined according to method ASTM E313-95.

EXAMPLE 1

Propylene-hexene-1 polymers are prepared by polymerising propylene and hexene-1 in the presence of a catalyst under continuous conditions in a plant comprising a precontact section, a prepolymerisation section and a polymerisation apparatus that comprises two interconnected cylindrical reactors, riser and downcomer. Fast fluidisation conditions are established in the riser by feeding gas recycled from the gas-solid separator.

The catalyst employed comprises a catalyst component prepared by analogy with example 5 of EP-A-728769 but using microspheroidal $MgCl_2 \cdot 1.7C_2H_5OH$ instead of $MgCl_2 \cdot 2.1C_2H_5OH$. Such catalyst component is mixed with dicyclopentyl dimethoxy silane (DCPMS) as external donor and with triethylaluminium (TEAL) in the precontact section. The catalyst system is then subjected to pre-polymerisation before introducing it into the polymerisation apparatus.

The polymer particles exiting the reactor are subjected to a steam treatment to remove the reactive monomers and volatile substances and then dried. The polymer particles are extruded with a usual packing of stabilisers.

Said usual packing of stabilizers comprises: 0.1% wt of Calcium Stearate, 0.25% wt of Irgafos 168, 0.05% wt of A.O.1790 N° 853 (Cyanox), 0.015% wt of SE-10 N° 203 (Hostanox) and 0.15% wt of DSTDP-IRGPS 802 FL.

The main operative conditions of the polymerisation process are indicated in Table 1.

In Table 2 are reported the main properties of the polymer.

EXAMPLE 2

Example 1 is repeated except that the usual packing of stabilizers was substituted by 0.05% wt of Calcium Stearate and 0.15% wt of Irganox 168 and 0.2% wt of Chimassorb 2020. The properties of the propylene-hexene-1 copolymers are reported in Table 2.

COMPARATIVE EXAMPLE 1 (1c)

Samples of the commercial product Stamilan P4935 available from Sabic.

COMPARATIVE EXAMPLE 2 (2c)

Samples of a propylene-ethylene copolymer having the characteristics specified in Table 2.

Static tensile test results are reported in Table 3.

Creep test results in terms of test conditions, failure mode and time, if the specimen failed within the test duration, are reported in Tables 4 and 5 respectively corresponding to the data collected for the specimens cut perpendicular to flow and for the specimens cut parallel to flow.

TABLE 1

| EXAMPLE | 1 |
|---|---|
| PRECONTACT | |
| TEMPERATURE, ° C. | 15 |
| RESIDENCE TIME, MIN | 13 |
| TEA/SOLID CATALYST COMPONENT, G/G | 5.0 |
| TEA/DCPMS, G/G | 4.0 |
| PREPOLYMERIZATION | |
| TEMPERATURE, ° C. | 25 |
| RESIDENCE TIME, MIN | 7.5 |
| POLYMERIZATION | |
| TEMPERATURE, ° C. | 85 |
| PRESSURE, BAR | 26 |
| $C_6^-/(C_3^- + C_6^-)$, mol/mol | 0.013 |
| $H_2/C_3^{--}$, mol/mol | 0.001 |

TABLE 2

| Examples | 1 | 2 | 1C | 2C |
|---|---|---|---|---|
| 1-hexene content, wt % | 1.1 | 1.1 | 0 | 0 |
| Ethylene content, wt % | 0 | 0 | 1.3 | 0.3 |
| MFR, g/10 min | 2.5 | 1.7 | 1.2 | 1.2 |
| Melting Temperature, ° C. | 149.9 | 150.3 | 156.3 | 159 |
| Crystallization Temperature, ° C. | 101.7 | 101.4 | 123 | 103.4 |
| Xylene-soluble content, wt % | 1.9 | 1.9 | 6.5 | 4 |
| A · Tm/B | 340 | 232 | — | — |

TABLE 3

Static tensile test results

| Examples | | 1 | 2 | 1c | 2c |
|---|---|---|---|---|---|
| Specimens cut perpendicular to flow, at 130° C. | Tensile Modulus, MPa | 205 | 190 | 140 | 260 |
| | Tensile Max Stress, MPa | 4.5 | 4.4 | 4.6 | 5.8 |
| Specimens cut parallel to flow, at 130° C. | Tensile Modulus, MPa | 140 | 145 | 130 | |
| | Tensile Max Stress, MPa | 4.8 | 5 | 5 | |

TABLE 4 creep to rupture test, specimens cut perpendicular to flow

| Examples | | | 1 | 2 | 1c | 2c |
|---|---|---|---|---|---|---|
| T = 130° C. Stress = 2.5 Mpa | Hours in oven | | 230 | 230 | 230 | 230 |
| | Crazes | | No | No | No | No |
| | Y/R | | No | No | No | No |
| | Strain % 200 hrs | | 3.2% | 3.0% | 4.6% | 2.9% |

TABLE 4-continued creep to rupture test, specimens cut perpendicular to flow

| Examples | | 1 | 2 | 1c | 2c |
|---|---|---|---|---|---|
| T = 130° C. | Hours in oven | 280 | 260 | 280 | |
| Stress = 3 | Crazes | Few | Few | Few | |
| Mpa | Y/R | No | No | No | |
| | Strain % 200 hrs | 4.1% | 4.1% | 7.2% | |
| T = 130° C. | Hours in oven | 280 | 280 | 158 | 158 |
| Stress = 3.5 | Crazes | Several | Several | Many | Several |
| Mpa | Y/R | No | No | 67 hrs (Y) | 50 hrs (R) |
| | Strain % 200 hrs | 5.8% | 6.3% | | |
| T = 130° C. | Hours in oven | 500 | 500 | | 158 |
| Stress = 4 | Crazes | Many | Many | | Many |
| Mpa | Y/R | 500 hrs (Y) | No | | 12 hrs (R) |
| | Strain % 200 hrs | 8.4% | 9.3% | | |
| T = 130° C. | Hours in oven | | 266 | | 266 |
| Stress = 4.2 | Crazes | | Many | | Many |
| Mpa | Y/R | | No | | 8.9 hrs (R) |
| | Strain % 200 hrs | | 15.4% | | |

TABLE 5

Creep to rupture test, specimens cut parallel to flow

| Examples | | 1 | 2 | 1c |
|---|---|---|---|---|
| T = 130° C. | Hours in oven | 250 | 250 | 250 |
| Stress = 3.5 Mpa | Crazes | No | No | 1-2 |
| | Y/R | No | No | No |
| | Strain % 200 hrs | 8.7% | 6.9% | 11.2% |
| T = 130° C. | Hours in oven | 250 | 260 | 250 |
| Stress = 4 Mpa | Crazes | No | Few | 1-2 |
| | Y/R | No | No | 2 hrs (Y) |
| | Strain % 200 hrs | 13.5% | 4.1% | |
| T = 130° C. | Hours in oven | 266 | 266 | |
| Stress = 4.2 Mpa | Crazes | No | No | |
| | Y/R | No | No | |
| | Strain % 200 hrs | 16.3% | 10.4% | |
| T = 130° C. | Hours in oven | 15 | 15 | 15 |
| Stress = 4.5 Mpa | Crazes | No | No | No |
| | Y/R | 0.27 hrs (Y) | 7.9 hrs (Y) | 0.08 hrs (Y) |
| | Strain % 200 hrs | | | |

Surprisingly, the propylene-hexene-1 copolymers according to the present invention show better results in terms of high temperature creep resistance with respect to the propylene-ethylene copolymers of the comparative examples. In particular, the specimens cut perpendicular to flow show no rupture nor yielding at 130° C. and 3.5 MPa whereas the propylene-ethylene copolymers according to the comparative examples at the same conditions exhibit poorer long term resistance performances.

Also at 4.2 MPa the creep resistance at 130° C. of the propylene-hexene-1 copolymers is much better than that of the propylene-ethylene copolymers, the first showing no rupture nor yielding and the latter showing rupture after only few hours.

The invention claimed is:

1. A plastic tank comprising a propylene-hexene-1 copolymer having a xylene soluble fraction lower than 5% wt with respect to the total weight of the copolymer and satisfying the following relation:

$(A \cdot T_m)/B$ is between 110 and 340, wherein A is the MFR measured according to the method ISO 1133 (230° C., 5 kg) expressed in g/10 min, $T_m$ is the melting temperature measured by DSC expressed in ° C. and B is the hexene-1 content expressed in percentage by weight with respect to total weight of the copolymer.

2. The plastic tank according to claim 1 wherein the value of $T_m$ of the propylene-hexene-1 copolymer is higher than 147° C.

3. The plastic tank according to claim 1 wherein the MFR of the propylene-hexene-1 copolymer is between 0.8 and 30 g/10 min.

4. The plastic tank according to claim 1 wherein the hexene-1 content of the propylene-hexene-1 copolymer ranges from 0.5 to 5% wt with respect to total weight of the copolymer.

5. The plastic tank according to claim 1 wherein said plastic tank further comprises from 200 to 3000 ppm of at least a Hindered Amine Light Stabiliser (HALS).

6. The plastic tank according to claim 1 wherein the plastic tank is an expansion tank.

* * * * *